(12) United States Patent
An et al.

(10) Patent No.: US 10,000,398 B2
(45) Date of Patent: Jun. 19, 2018

(54) IN-SITU PURIFICATION ISLAND STRUCTURE AND THE CONSTRUCTION METHOD THEREOF

(71) Applicant: NANJING UNIVERSITY ECOLOGICAL RESEARCH INSTITUTE OF CHANGSHU, Suzhou, Jiangsu (CN)

(72) Inventors: Shuqing An, Jiangsu (CN); Lingyan Zhou, Jiangsu (CN); Lijun Ren, Jiangsu (CN); Yuyuan Zhang, Jiangsu (CN)

(73) Assignee: NANJING UNIVERSITY ECOLOGICAL RESEARCH INSTITUTE OF CHANGSHU, Suzhou (CN)

( * ) Notice: Subject to any disclaimer, the term of this patent is extended or adjusted under 35 U.S.C. 154(b) by 113 days.

(21) Appl. No.: 15/121,056

(22) PCT Filed: Dec. 5, 2014

(86) PCT No.: PCT/CN2014/093086
§ 371 (c)(1),
(2) Date: Aug. 24, 2016

(87) PCT Pub. No.: WO2015/139485
PCT Pub. Date: Sep. 24, 2015

(65) Prior Publication Data
US 2016/0376181 A1    Dec. 29, 2016

(30) Foreign Application Priority Data

Mar. 21, 2014 (CN) .......................... 2014 1 0107220

(51) Int. Cl.
*E02B 3/02* (2006.01)
*C02F 3/32* (2006.01)
(Continued)

(52) U.S. Cl.
CPC .............. *C02F 3/327* (2013.01); *C02F 3/046* (2013.01); *C02F 3/301* (2013.01); *C02F 3/308* (2013.01);
(Continued)

(58) Field of Classification Search
CPC ... E02B 3/02; E02B 3/10; E02B 3/122; E02B 3/18; C02F 3/046; C02F 3/301; C02F 3/327; C02F 2103/007
(Continued)

(56) References Cited

U.S. PATENT DOCUMENTS 7,087,161 B1 * 8/2006 Nishibori ................ C02F 3/327
210/170.09
7,314,562 B2 * 1/2008 Svirklys .................. C02F 3/327
210/170.09
(Continued)

FOREIGN PATENT DOCUMENTS

CN          203247173 U     10/2013
CN          103395930 A     11/2013

*Primary Examiner* — Christopher Upton

(57) ABSTRACT

An in-situ purification island structure and the construction method thereof, which refers to the field of sewage treatment technology. The in-situ purification island structure comprises the upstream purification island main body and the downstream purification island main body, in which the upstream purification island main body comprises the first base backfill layer, the first lower layer, the first hydrophobic layer, the first water permeable layer and the first upper layer. The first ecological bags are set around the surface of the first base backfill layer. The first lower layer has center formed with a lower layer backfill transitional zone. The first hydrophobic layer has center formed with a hydrophobic layer backfill transitional zone. It has a good natural purifying effect on the sewage, saves the investment and cost, no limitation on the applications, the capacity and efficiency of the purifying is high, and saves the resource.

10 Claims, 2 Drawing Sheets

(51) Int. Cl.

| | |
|---|---|
| *C02F 3/30* | (2006.01) |
| *E02B 3/12* | (2006.01) |
| *E02B 3/18* | (2006.01) |
| *E02F 1/00* | (2006.01) |
| *C02F 3/04* | (2006.01) |
| *C02F 103/00* | (2006.01) |

(52) U.S. Cl.
 CPC ............... *E02B 3/02* (2013.01); *E02B 3/023* (2013.01); *E02B 3/026* (2013.01); *E02B 3/122* (2013.01); *E02B 3/18* (2013.01); *E02F 1/00* (2013.01); *C02F 2103/007* (2013.01); *Y02A 10/383* (2018.01); *Y02W 10/15* (2015.05)

(58) Field of Classification Search
 USPC ...... 210/170.09, 170.1, 602, 747.5; 405/107, 405/116, 117
 See application file for complete search history.

(56) References Cited

U.S. PATENT DOCUMENTS

| | | | |
|---|---|---|---|
| 8,287,728 B2* | 10/2012 | Kania ..................... | C02F 3/327 210/602 |
| 8,641,893 B2* | 2/2014 | Torres Junco .......... | C02F 3/327 210/170.1 |
| 8,894,849 B1* | 11/2014 | Shelley .................. | C02F 3/301 210/602 |
| 9,878,931 B2* | 1/2018 | An ......................... | C02F 3/327 |
| 2011/0100905 A1* | 5/2011 | Ahn ....................... | C02F 3/302 210/170.1 |
| 2012/0087735 A1* | 4/2012 | Van Den Broeck .... | E02B 33/10 405/117 |

* cited by examiner

IN-SITU PURIFICATION ISLAND STRUCTURE AND THE CONSTRUCTION METHOD THEREOF

TECHNICAL FIELD

This present invention refers to the field of sewage treatment technology, and more particularly to an in-situ purification island structure, and the construction method of the in-situ purification island structure.

BACKGROUND ART

The concept of the in-situ purification island mentioned above means the facilities to naturally purify the polluted water system of rivers or lakes, constructed with the bed of river or lacustrine as the carrier.

As an important carrier of natural resources and the environment, rivers and lakes have the economic functions as flood controlling and drainage, farm irrigation, water supply, shipping and farming, and the ecological functions as providing habitat and thereby reflecting biodiversity, climate regulation, improvement of the environment, shaping the landscape and water conservation, which has an important realistic and future significance to the rise and fall of the city and the economic development and prosperity.

Although the protection of water environment has become the consensus of the people, a lot of industrial and urban sewage is discharged directly to rivers and lakes without required treatment due to the limitation of variety of subjective and objective conditions, which pollutes the water bodies and also damages the bed soil of rivers and lakes. Especially when the water is contaminated by such as nitrogen, phosphorus, organic pollutants and various heavy metals elements, the situation of water sub-quantity becomes more seriously. Therefore, the improvement of water treating ability and water treating efficiency to make use of sewage has a positive realistic and long-term significance for solving the scarceness of water resource in our country.

Due to the advantages such as no occupying the ground, no interference from the building on the ground, saving the investment, no energy consumption, tending to be maintenance-free and good and long effect of water-repairing, improving the water quantity based on the natural purification mechanism of water in the rivers is recognized in the field and gradually becomes a trend. However, because of large flow of river and complex morphology and the natural purification of water is a complex process affected by many factors, it will not only cost high in construction, operation and maintenance but also has poor landscape according to the conventional treatment of sewage.

The technical information about natural purification of river water can be found in the published Chinese patent documents, typically as the "a high-hydraulic loading soil percolation system" recommended by CN203247173U, which consisted of a surface covering layer, a water distributing groove, a water distributing tank arranged in the water distribution groove, a first artificial filler, a bottom supporting layer and a water outlet pipe. The point is that to arrange a clay pan between the first and the second artificial filling layers, and both the first and the second artificial filling layers are consisted of fine particles and coarse particles of vermiculite layers, in which the fine layer is above the coarse one. Although technical effect in the paragraph 0010 of description can be achieved, the solution in the patent still has disadvantages: firstly, it's construction tedious due to the need of laying pipelines (distributing pipe and outlet pipe), and it's difficult or impossible to repair once the pipe blocked; secondly, the risk of the outlet pipe blocking is high because the first and the second filling layers are consisted of fine and coarse particles separately and the outlet pipe is arranged in the bottom; thirdly, it's difficult if not impossible to intercept point source pollution in river because of the limitation of the construction. Another solution provided by CN103395930A is "an ecological slope protection type sewage land infiltration system and the infiltration method thereof", in which a grid pond, an anaerobic hydrolyzing pond and a stepped land infiltration unit are arranged sequentially along the gradient of a sloping field from top to bottom to form a stepped (also known as terraced) structure, but it has the disadvantages such as the high construction cost, the difficulty in construction, the high operation consumption and the poor landscape, at the same time, it is often with special requirements to the slope of the river.

According to the prior art above, there is a need to improve, so the applicant made some useful exploration and finally formed the technical solution will be introduced following. And the results proved to be feasible after the repeated deduction experiments under the security measures.

SUMMARY OF THE INVENTION

The primary task of the present invention is to provide an in-situ purification island structure, which will help to intercept the pollutants in the river systems to improve the purifying effect of polluted water obviously, and will help to reflect the long-lasting effect of maintenance-free and no energy consumption and thereby saving cost, and will help to avoid the requirements to the applications to achieve the adaptability to the rivers, and will help to improve the amount of water to be treated to increase the treating efficiency of the in-situ purification island structure.

The another task of the present invention is to provide a construction method of the in-situ purification island, which is easy to be constructed to save cost, and the silt in the riverbed is used to save sources, and the said technical effect of the in-situ purification island structure can be comprehensively embodied.

The primary task of the present invention is accomplished as below. An in-situ purification island structure comprises an upstream purification island main body located on the upstream of a river and a downstream purification island main body located on the downstream of the river. Said upstream purification island main body comprises a first base backfill layer, a first lower layer, a first hydrophobic layer, a first water permeable layer, and a first upper layer. The first base backfill layer is set on a river bed and an upper part of the first base backfill layer is parallel to a horizontal plane of the river's water level. The first lower layer is located on the upper part of the first base backfill layer. The first hydrophobic layer is located on an upper part of the first lower layer. The first water permeable layer is covering an upper part of the first hydrophobic layer. The first upper layer is located on an upper part of the first water permeable layer. A plurality of first ecological bags are set around a surface of the first base backfill layer. The first lower layer has a central opening defining a lower layer backfill transitional zone. The first hydrophobic layer has a central opening defining a hydrophobic layer backfill transitional zone. The first water permeable layer has a central opening defining a water permeable layer backfill transitional zone. The upper part of the first base backfill layer passes through the lower layer backfill transitional zone, the hydrophobic layer backfill transitional zone and the water permeable layer backfill transitional zone successively, and extends to an area between the first water permeable layer and the first upper layer so as to form a first base backfill layer peak. The first upper layer has a surface paved with a first protecting layer. A peak protective layer is formed on top of the first base backfill layer peak within a central opening formed in the first upper layer and the first protecting layer. The downstream purification island main body comprises a second base backfill layer, a second lower layer, a second hydrophobic layer, a second water permeable layer, and a second upper layer. The second base backfill layer is set on the river bed and an upper of the second base backfill layer is parallel to the horizontal plane of the river's water level. The second lower layer is located on an upper part of the second base backfill layer. The second hydrophobic layer is located on an upper part of the second lower layer. The second water permeable layer is covering an upper part of the second hydrophobic layer. The second upper layer is located on an upper part of the second water permeable layer. A plurality of second ecological bags are set around a surface of the second base backfill layer. A center area between the second water permeable layer and the second upper layer is formed with a second base backfill layer peak. The second upper layer has a surface paved with a second protecting layer.

In one embodiment of the present invention, said first base backfill layer, the first base backfill layer peak, the second base backfill layer and the second base backfill layer peak are the dredged silt in the river.

In one embodiment of the present invention, said first lower layer and said second lower layer are consisted of gravels with 2-4 mm diameter, and have a thickness of 25 cm.

In another embodiment of the present invention, said first hydrophobic layer and said second hydrophobic layer are consisted of coal cinders with 0.8-1.2 mm diameter, and have a thickness of 20 cm.

In another embodiment of the present invention, said first water permeable layer and said second water permeable layer are water permeable cloth.

In another embodiment of the present invention, said water permeable cloth is non-woven fabrics with 500-1000 g/m$^2$ weight.

In the further embodiment of the present invention, said first upper layer and said second upper layer are consisted of soil with 30 cm thickness, said peak protective layer are sandstones with 50 cm thickness.

In the further embodiment of the present invention, the structure of said second protecting layer is the same as that of the first protecting layer, and the first protecting layer is constructed with slope protection bricks which are hexagon, and each slope protection brick has a center formed with a filling cavity.

Another task of the present invention is accomplished. The construction method of the in-situ purification island structure comprises the steps as below:

A) Constructing the upstream purification island main body. Before dredging silt and returning water in the river, the first base backfill layer is built by the silt dredged from the river. The upper of the first base backfill layer is parallel to horizontal plane of river water level. The first lower layer is arranged on the upper part of first backfill layer. The first hydrophobic layer is arranged on the upper part of the first layer. The first water permeable layer is covered on the first hydrophobic layer. The first upper layer is arranged on the upper part of the first water permeable layer. The first ecological bags are set around the surface of the first base backfill layer. The first lower layer has a central opening defining a lower layer lower layer backfill transitional zone. The first hydrophobic layer has a central opening defining a hydrophobic layer backfill transitional zone. The first water permeable layer has a central opening defining a water permeable layer backfill transitional zone. The upper part of the first base backfill layer passes through the lower layer backfill transitional zone, the hydrophobic layer backfill transitional zone and the water permeable layer backfill transitional zone successively, and extends to the area between the first water permeable layer and the first upper layer so as to form a first base backfill layer peak. The first upper layer has surface paved with a first protecting layer. A peak protective layer is formed on top of the first base backfill layer peak within the central opening formed in the first upper layer and the first protecting layer.

B) Constructing the downstream purification island main body. Before dredging silt and returning water in the river, the second base backfill layer is built by the silt dredged from the river. The upper part of the second base backfill layer is parallel to horizontal plane of river water level. The second lower layer is arranged on upper part of second base backfill layer. The second hydrophobic layer is arranged on the upper part of the second upper layer. The second water permeable layer is covered on the upper part of the second hydrophobic layer. The second upper layer is arranged on the upper part of the second water permeable layer. The second ecological bags are set around the surface of the second base backfill layer. The area between the second penetrating water layer and the second upper layer has center area formed with a second base backfill layer peak. The second upper layer has surface paved with a second protecting layer.

In further embodiment of the present invention, the volume of said upstream purification island main body is twice as much as that of said downstream purification island main body, while the heights of the upstream purification island main body and downstream purification island main body are the same.

The technical effects according to the technical solution in the present invention are 1) pollutants in the river can be intercepted by the upstream purification island main body and the downstream purification island main body, which has good natural purifying effect to the polluted water; 2) it can save consumption because of no need for anthropogenic power energy and can save cost of investment and usage because of maintenance-free; 3) there is no limitation by applications because it is arranged on the bed of the river directly; 4) the capacity and efficiency of the purifying is high because the river purification is achieved by the flow of the river; 5) it can save resource because the first base backfill layer and the second base backfill layer are directly built up by the silt dredged from the river.

DESCRIPTION OF EMBODIMENTS

Embodiment

Figure 1:
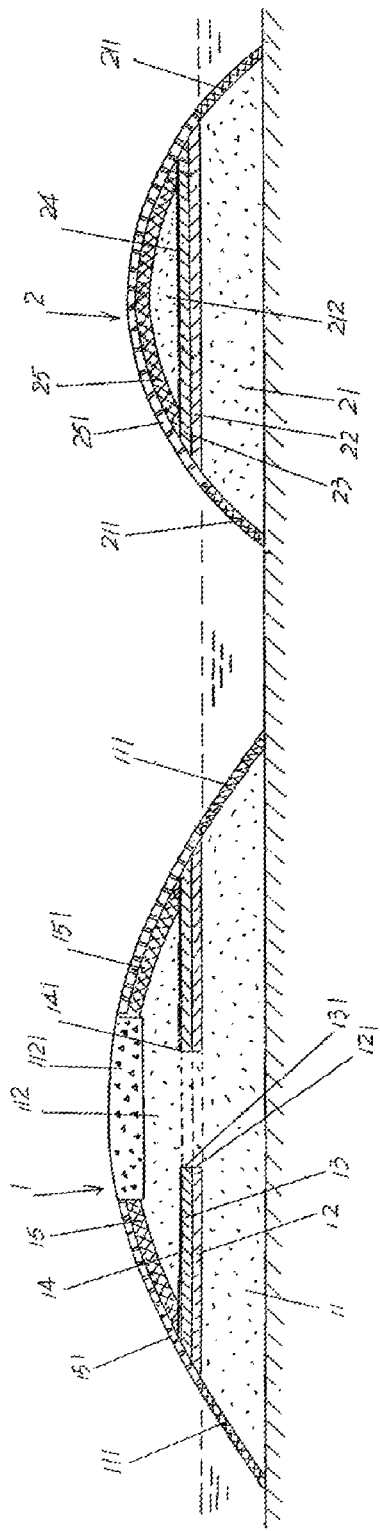
FIG. 1 is a schematic view according to the embodiment of the present invention.

Referring to the drawing, constructing the in-situ purification island shown in the FIG. 1 comprises the steps as below:

A) Constructing the upstream purification island main body 1. Before dredging silt and returning water in the river, the first base backfill layer 11 is built by the silt dredged from the river. The upper of the first base backfill layer 11 is parallel to horizontal plane of river water level. The first lower layer 12 is arranged on the upper part of first backfill layer 11. The first hydrophobic layer 13 is arranged on the upper part of the first lower layer 12. The first water permeable layer 14 is covering the upper part of the first hydrophobic layer 13. The first upper layer 15 is arranged on the upper part of the first water permeable layer 14. The first ecological bags 111 are set around the surface of the first base backfill layer 11. The first lower layer 12 has center formed with a lower layer backfill transitional zone 121. The first hydrophobic layer 13 has center formed with a hydrophobic layer backfill transitional zone 131. The first water permeable layer 14 has center provided with a water permeable layer backfill transitional zone 141. The upper of aforementioned first base backfill layer 11 pass through the lower layer backfill transitional zone 121, the hydrophobic layer backfill transitional zone 131 and the water permeable layer backfill transitional zone 141 successively, and extend to the area between the first water permeable layer 14 and the first upper layer 15 so as to form a first base backfill layer peak 112 with a peak protective layer 1121 provided on the top. The first upper layer 15 has surface paved with a first protecting layer 151.

B) Constructing the downstream purification island main body 2. Before dredging silt and returning water in the river, the second base backfill layer 21 is built by the silt dredged from the river. The upper of the second base backfill layer 21 is parallel to horizontal plane of river water level. The second lower layer 22 is arranged on upper part of second base backfill layer 21. The second hydrophobic layer 23 is arranged on the upper part of the second lower layer 22. The second water permeable layer 24 is covering the upper part of the second hydrophobic layer 23. The second upper layer 25 is arranged on the upper part of the second water permeable layer 24. The second ecological bags 211 are set around the surface of the second base backfill layer 21. The area between the second water permeable layer 24 and the second upper layer 25 has center formed with a second base backfill layer peak 212. The second upper layer 25 has surface paved with a second protecting layer 251.

In one embodiment of the present invention, the aforementioned first lower layer 12 and the second lower layer 22 are consisted of gravels with 2-4 mm diameter and the height of the first lower layer 12 and the second lower layer 22 are 25 cm thickness. The aforementioned first hydrophobic layer 13 and the second hydrophobic layer 23 are consisted of coal cinders with 0.8-1.2 mm diameter and 20 cm thickness; the aforementioned first water permeable layer 14 and the second water permeable layer 24 are non-woven fabrics with 1000 g/m$^2$ weight (or non-woven fabrics with 500 g/m$^2$ or 750 g/m$^2$ weight); the aforementioned first upper layer 15 and the second upper layer 25 are consisted of soil (or the fresh soil) with 30 cm thickness; the aforementioned peak protective layer 1121 are sandstones with 50 cm thickness; the structure of the aforementioned second protecting layer 251 is the same as that of the first protecting layer 151. The aforementioned first base backfill layer peak 151 and the second base backfill layer peak 212 are silt dredged from the river.

Figure 2:
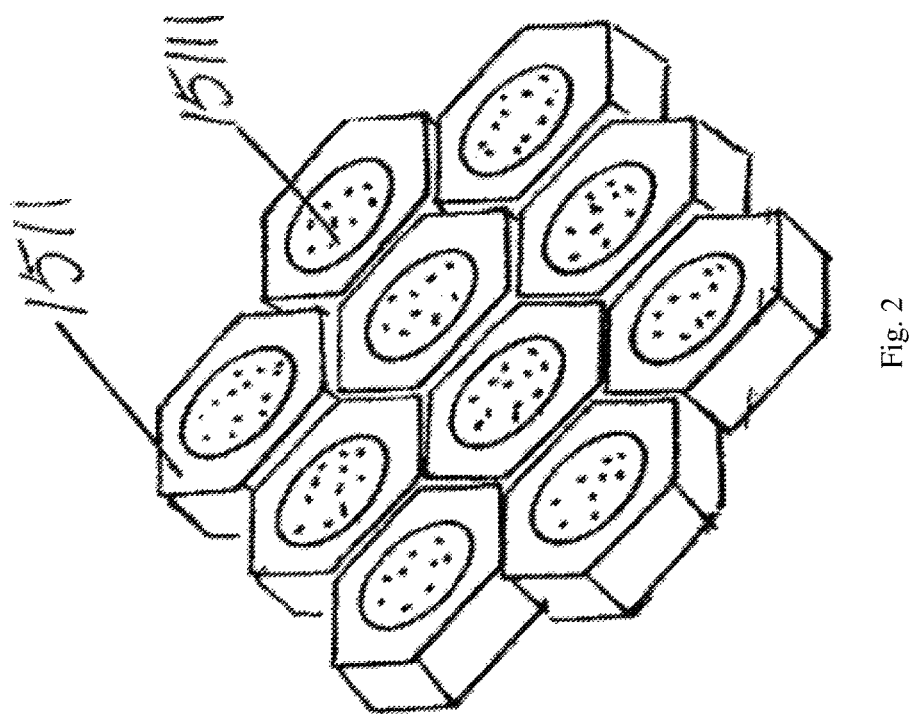
FIG. 2 is the structure view of the first protecting layer and the second protecting layer shown in FIG. 1.

Referring to FIG. 2 combining with FIG. 1, the aforementioned first protecting layer 151 is constructed (i.e. constructed by inlaying each other) with the slope protection bricks 1511 which are hexagon and with a filling cavity 15111 in the center. The filling cavity 15111 is filled with soil and emerged plants such as calamus are planted in the soil of the filling cavity 15111.

Preferably, the volume ratio of the aforementioned upstream purification island main body 1 and the downstream purification island main body 2 is 2:1, while the heights are the same. The shape of the upstream purification island main body 1 and the downstream purification island main body 2 are half spherical.

The aforementioned ecological bags are made up of the double-surface ironing needle-punched non-woven fabric with polypropylene (PP) or polyester (PET) as a raw material, with the advantage of anti-ultraviolet (UV), anti-aging, non-toxic and free from acid corrosion etc. The bags are filled with the silt dredged from the river. When the river water flow the in-situ purification island of the present invention, sewage will be evenly distributed to the multi-layered artificial soil substrate with penetrability and difference, and will be degradated and removed by means of intercepting, adsorption, chemical reactions and biological degradation.

The penetration of the in-situ purification island weakens gradually from the top to bottom, and forms a multilayer filtering structure to make the particles with different size dispersed in the soil, substrate and the contacting surface with different penetration, which helps to improve the efficiency of degradation. Take the upstream purification island main body 1 as example, when distributing the water, sewage is distributed evenly from the first lower layer 12 to the first base backfill layer 11, and flow down. During the distribution, the moisture in soil is basically saturated, and the oxygen in soil is rapidly consumed and has not been replenish, so the first base backfill layer 11 is at an anaerobic condition. When the first distribution finished, the moisture in the first lower layer 12 become dry, and the oxygen in soil is replenished in time, so the oxygen supplying interlayer is at the aerobic environment, the redox potential in lower soil also increases significantly, with the degradation of organic matter accelerating and the ammonification and nitrification of organic nitrogen occurring. After a while, with the depth increasing, the oxygen in soil reduces gradually. After running a cycle, the soil goes through the aerobic environment gradually into the anaerobic environment, and the nitrogen in sewage is degradated and removed. At the same time, phosphorus in the soil is removed by adsorption, chemical precipitation and accumulation of microorganisms. As the in-situ purification island has a slope, it's helpful for the sewage flows back into the river after the treatment. The organic matter in the artificial soil accumulates with the system running. Due to the alternative environment between dry and wet, the aggregate structure with multi-stage holes is formed inside the soil to ensure the penetration, air permeability and stability of the processing efficiency of the soil. The alternative between dry and wet can prevent the excessive blockage in the holes on the surface caused by the accumulation of organic matter and microbial metabolites, recover the penetration of the system effectively, and keep the stable treatment capacity and efficiency. The downstream purification island main body 2 is similar and not repeat here.

What is claimed is:

1. An in-situ purification island structure, characterized in that the structure comprises an upstream purification island main body (1) located on the upstream of a river and a downstream purification island main body (2) located on the downstream of the river; said upstream purification island main body (1) comprises a first base backfill layer (11), a first lower layer (12), a first hydrophobic layer (13), a first water permeable layer (14), and a first upper layer (15); the first base backfill layer (11) is set on a river bed and an upper part of the first base backfill layer (11) is parallel to a horizontal plane of the river's water level; the first lower layer (12) is located on the upper part of the first base backfill layer (11); the first hydrophobic layer (13) is located on an upper part of the first lower layer (12); the first water permeable layer (14) is covering an upper part of the first hydrophobic layer (13); the first upper layer (15) is located on an upper part of the first water permeable layer (14); a plurality of first ecological bags (111) are set around a surface of the first base backfill layer (11); the first lower layer (12) has a central opening defining a lower layer backfill transitional zone (121); the first hydrophobic layer (13) has a central opening defining a hydrophobic layer backfill transitional zone (131); the first water permeable layer (14) has a central opening defining a water permeable layer backfill transitional zone (141); the upper part of the first base backfill layer (11) passes through the lower layer backfill transitional zone (121), the hydrophobic layer backfill transitional zone (131) and the water permeable layer backfill transitional zone (141) successively, and extends to an area between the first water permeable layer (14) and the first upper layer (15) so as to form a first base backfill layer peak (112); the first upper layer (15) has a surface paved with a first protecting layer (151); a peak protective layer (1121) is formed on top of the first base backfill layer peak (112) within a central opening formed in the first upper layer (15) and the first protecting layer (151); the downstream purification island main body (2) comprises a second base backfill layer (21), a second lower layer (22), a second hydrophobic layer (23), a second water permeable layer (24), and a second upper layer (25); the second base backfill layer (21) is set on the river bed and an upper of the second base backfill layer (21) is parallel to the horizontal plane of the river's water level; the second lower layer (22) is located on an upper part of the second base backfill layer (21); the second hydrophobic layer (23) is located on an upper part of the second lower layer (22); the second water permeable layer (24) is covering an upper part of the second hydrophobic layer (23); the second upper layer (25) is located on an upper part of the second water permeable layer (24); a plurality of second ecological bags (211) are set around a surface of the second base backfill layer (21); a center area between the second water permeable layer (24) and the second upper layer (25) is formed with a second base backfill layer peak (212); the second upper layer (25) has a surface paved with a second protecting layer (251).

2. The in-situ purification island structure according to claim 1, characterized in that said first base backfill layer (11), the first base backfill layer peak (112), the second base backfill layer (21) and the second base backfill layer peak (212) are slit dredged from the river.

3. The in-situ purification island structure according to claim 1, characterized in that said first lower layer (12) and said second lower layer (22) are consisted of gravels with 2-4 mm diameter, and have a thickness of 25 cm.

4. The in-situ purification island structure according to claim 1, characterized in that said first hydrophobic layer (13) and said second hydrophobic layer (23) are consisted of coal cinders with 0.8-1.2 mm diameter, and have a thickness of 20 cm.

5. The in-situ purification island structure according to claim 1, characterized in that said first water permeable layer (14) and said second water permeable layer (24) are water permeable cloth.

6. The in-situ purification island structure according to claim 5, characterized in that said water permeable cloth is non-woven fabrics with 500-1000 g/m² weight.

7. The in-situ purification island structure according to claim 1, characterized in that said first upper layer (15) and said second upper layer (25) are consisted of soil with 30 cm thickness, said peak protective layer (1121) are sandstones with 50 cm thickness.

8. The in-situ purification island structure according to claim 1, characterized in that the structure of said second protecting layer (251) is the same as that of the first protecting layer (151), and the first protecting layer (151) is constructed with slope protection bricks (1511) which are hexagon, and each slope protection brick has a center formed with a filling cavity (15111).

9. A construction method for the in-situ purification island structure according to claim 1, characterized in that the method comprises the following steps:

A) constructing the upstream purification island main body (1): before dredging silt and returning water in the river, building the first base backfill layer (11) by the silt dredged from the river; making the upper part of the first base backfill layer (11) parallel to the horizontal plane of the river's water level; arranging the first lower layer (12) on the upper part of first backfill layer (11); arranging the first hydrophobic layer (13) on the upper part of the first lower layer (12); covering the first water permeable layer (14) on the upper part of the first hydrophobic layer (13); arranging the first upper layer (15) on the upper part of the first water permeable layer (14); setting the first ecological bags (111) around the surface of the first base backfill layer (11); forming the lower layer backfill transitional zone (121) in the central opening of the first lower layer (12); forming the hydrophobic layer backfill transitional zone (131) in the central opening of the first hydrophobic layer (13); forming the water permeable layer backfill transitional zone (141) in the central opening of the first water permeable layer (14); making the upper part of the first base backfill layer (11) pass through the lower layer backfill transitional zone (121), the hydrophobic layer backfill transitional zone (131) and the water permeable layer backfill transitional zone (141) successively, and extend to the area between the first water permeable layer (14) and the first upper layer (15) so as to form the first base backfill layer peak (112); paving the first protecting layer (151) on the surface of the first upper layer (15); forming a peak protective layer (1121) on top of the first base backfill layer peak (112) within the central opening formed in the first upper layer (15) and the first protecting layer (151);

B) constructing the downstream purification island main body (2): before dredging silt and returning water in the river, building the second base backfill layer (21) by the silt dredged from the river; making the upper part of the second base backfill layer (21) parallel to the horizontal plane of the river's water level; arranging the second lower layer (22) on the upper part of second base backfill layer (21); arranging the second hydrophobic layer (23) on the upper part of the second lower layer (22); arranging the second water permeable layer (24) on the upper part of the second hydrophobic layer (23); arranging the second upper layer (25) on the upper part of the second water permeable layer (24); setting the second ecological bags (211) around the surface of the second base backfill layer (21); forming the second base backfill layer peak (212) in the center area between the second water permeable layer (24) and the second upper layer (25); paving the second protecting layer (251) on the surface of the second upper layer (25).

10. The construction method for the in-situ purification island structure according to claim 9, characterized in that the volume of said upstream purification island main body (1) is twice as much as that of said downstream purification island main body (2), while heights of the upstream purification island main body (1) and the downstream purification island main body (2) are the same.

* * * * *